US012739625B2

(12) United States Patent
Chandramouli et al.

(10) Patent No.: US 12,739,625 B2
(45) Date of Patent: Sep. 15, 2026

(54) METHOD AND APPARATUS TO DELIVER MULTIPLE NAS CONTAINERS VIA A SINGLE ACCESS STRATUM MESSAGE

(71) Applicant: Nokia Technologies Oy, Espoo (FI)

(72) Inventors: Devaki Chandramouli, Plano, TX (US); Martin McGrath, Coppell, TX (US); Sung Hwan Won, Flower Mound, TX (US)

(73) Assignee: NOKIA TECHNOLOGIES OY, Espoo (FI)

( * ) Notice: Subject to any disclaimer, the term of this patent is extended or adjusted under 35 U.S.C. 154(b) by 58 days.

(21) Appl. No.: 18/610,030

(22) Filed: Mar. 19, 2024

(65) Prior Publication Data

US 2025/0301311 A1 Sep. 25, 2025

(51) Int. Cl.
*H04W 12/037* (2021.01)
*H04W 8/26* (2009.01)

(52) U.S. Cl.
CPC .......... *H04W 12/037* (2021.01); *H04W 8/26* (2013.01)

(58) Field of Classification Search
CPC .............................. H04W 12/037; H04W 8/26
USPC .......................................................... 380/270
See application file for complete search history.

(56) References Cited

U.S. PATENT DOCUMENTS 9,155,121 B2 * 10/2015 Rayavarapu .......... H04W 76/19
11,917,707 B2 * 2/2024 Da Silva ............. H04W 12/106
2016/0286600 A1 9/2016 Faccin et al.
2018/0213403 A1 * 7/2018 Shi ...................... H04W 12/033
2020/0177333 A1 6/2020 Liu (Continued)

FOREIGN PATENT DOCUMENTS

WO 2018144175 A1 8/2018
WO WO-2019092059 A1 * 5/2019 ............. H04L 69/22

(Continued)

OTHER PUBLICATIONS

Miller et al., "Systematic Improvement of Access-Stratum Security in Mobile Networks," 2023 IEEE 8th European Symposium on Security and Privacy (EuroS&P), Delft, Netherlands, 2023, pp. 542-557, doi: 10.1109/EuroSP57164.2023.00039. (Year: 2023).*

(Continued)

*Primary Examiner* — Peter C Shaw
(74) *Attorney, Agent, or Firm* — Carter, DeLuca & Farrell LLP

(57) ABSTRACT

A method includes receiving, at an AS layer of a user equipment (UE), a plurality of NAS payloads, wherein a first NAS payload is received from a first NAS sublayer and a subsequent payload is received from a subsequent NAS sublayer, encrypting, by the UE, the first payload with a first encryption generating a first encrypted payload and the subsequent payload with a subsequent encryption generating a subsequent encrypted payload, wherein the first encryption is associated with a first network function and the subsequent encryption is associated with a subsequent network function, generating, by the UE, a first message that includes a first temporary identifier including of routing information for the first network function and a first container, and a subsequent container, wherein the first container includes the first encrypted payload and the subsequent container includes the subsequent encrypted payload, and transmitting the first message to a first apparatus.

20 Claims, 6 Drawing Sheets

(56) References Cited

U.S. PATENT DOCUMENTS

| | | | | |
|---|---|---|---|---|
| 2021/0211960 | A1* | 7/2021 | Ryu | H04W 76/12 |
| 2023/0269780 | A1* | 8/2023 | Ravishankar | H04B 7/185 370/329 |

FOREIGN PATENT DOCUMENTS

| | | | | |
|---|---|---|---|---|
| WO | WO-2019092244 | A1 * | 5/2019 | H04W 76/22 |
| WO | 2023055342 | A1 | 4/2023 | |
| WO | 2024035434 | A1 | 2/2024 | |

OTHER PUBLICATIONS

Chandramouli et al., "Modular NAS Protocol Design for 6G," in IEEE Communications Standards Magazine, doi: 10.1109/MCOMSTD.2026.3657282. (Year: 2026).*

Li et al., "Micro-service-based radio access network," in China Communications, vol. 19, No. 3, pp. 1-15, Mar. 2022, doi: 10.23919 JCC.2022.03.001. (Year: 2022).*

Janakieska et al., "Signaling in 4G/5G with NB-IoT support in 5G Option 3," 2020 55th International Scientific Conference on Information, Communication and Energy Systems and Technologies (ICEST), Niš, Serbia, 2020, pp. 54-57, doi: 10.1109/ICEST49890.2020.9232687. (Year: 2020).*

International Search Report and Written Opinion issued for PCT/EP2025/057494, Jul. 1, 2025, 21 pages.

* cited by examiner

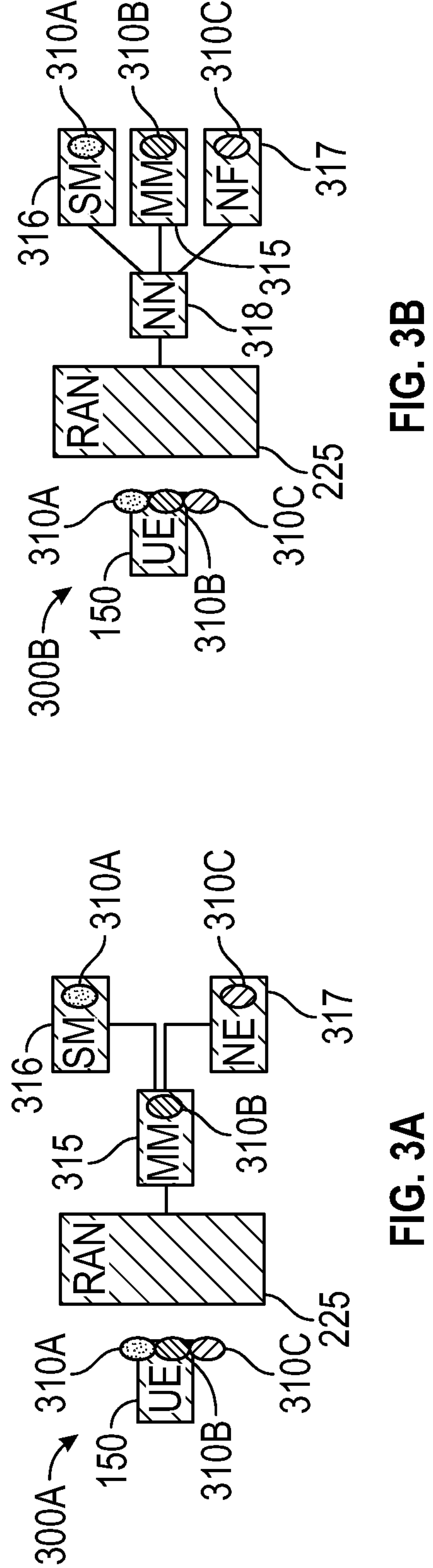
FIG. 3B
FIG. 3A
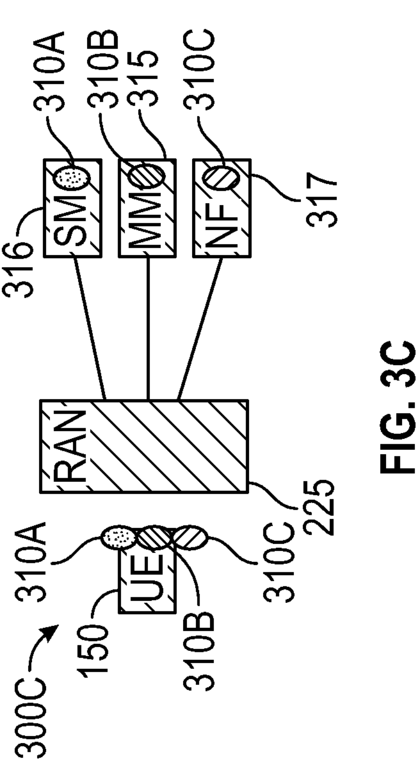
FIG. 3C

METHOD AND APPARATUS TO DELIVER MULTIPLE NAS CONTAINERS VIA A SINGLE ACCESS STRATUM MESSAGE

FIELD

Various example embodiments relate generally to wireless networks and, more particularly, to delivery of multiple non access stratum (NAS) containers via a single access stratum message.

BACKGROUND

In distributed non access stratum (NAS) architecture, multiple upper layer messages (e.g., NAS messages) are sent from a user equipment (UE) to multiple network functions (NFs) and vice versa using one lower layer message.

In a modular NAS with point to point (P2P) interfaces for a radio access network (RAN)-Core Network (CN) interface, a sender may transmit multiple NAS containers. These containers will need to be protected and secured.

SUMMARY

In an aspect of the present disclosure, a method includes receiving, at an AS layer of a user equipment (UE), a plurality of NAS payloads, wherein a first NAS payload is received from a first NAS sublayer and a subsequent payload is received from a subsequent NAS sublayer, encrypting, by the UE, the first payload with a first encryption generating a first encrypted payload and the subsequent payload with a subsequent encryption generating a subsequent encrypted payload, wherein the first encryption is associated with a first network function and the subsequent encryption is associated with a subsequent network function, generating, by the UE, a first message that includes a first temporary identifier comprising of routing information for the first network function and a first container, and a subsequent container, wherein the first container includes the first encrypted payload and the subsequent container includes the subsequent encrypted payload, and transmitting the first message to a first apparatus.

In an aspect of the method, the first message includes a flag identifier that identifies that the first apparatus is to forward the first container to the first network function based on the first temporary identifier comprising of the routing information and the subsequent containers to the subsequent network functions based on the subsequent temporary identifiers comprising of routing information for those network functions.

In an aspect of the method, the first message includes a flag identifier that identifies that the first apparatus is to forward the first container to the first network function based on the first routing information and store the subsequent containers.

In an aspect of the method, the first message includes an indicator number that indicates the first apparatus is to forward the indicated number of containers to the first network function and store the other containers until the first apparatus receives further routing information for routing other containers.

In an aspect of the method, the UE is not in a radio resource control (RRC) connected mode.

In an aspect of the method, the first routing information is included in a first temporary identifier and subsequent routing information is included in a subsequent temporary identifier.

In an aspect of the method, the first temporary identifier is a serving temporary mobile subscriber identifier (S-TMSI) for the first NAS container targeted for the network function and the subsequent temporary identifier is an S-TMSI for the subsequent NAS container targeted for the network function.

In an aspect of the method, the first apparatus is a radio access network (RAN).

In an aspect of the method, the subsequent container includes the encrypted subsequent payload.

In an aspect of the present disclosure, a method includes receiving, by a first apparatus, a first message from a user equipment (UE), the first message including a first temporary identifier comprising routing information for forwarding a first non access stratum (NAS) container, a first container and a subsequent container, wherein the first container includes a first encrypted payload, and the subsequent container includes a subsequent encrypted payload and subsequent temporary identifier comprising routing information for forwarding the subsequent network function. The first apparatus reads at least the first routing information, and transmits the first container to the first network function based on the first temporary identifier.

In an aspect of the method, the first message includes a flag identifier or a number identifier.

In an aspect of the method, wherein upon the flag identifier being set to a first value, the first apparatus reads the subsequent temporary identifier and transmits the subsequent container to the subsequent network function based on the subsequent temporary identifier.

In an aspect of the method, wherein upon the flag identifier being set to a second value, the first apparatus stores the subsequent container.

In an aspect of the method, the method further includes receiving, by the first apparatus, a second message from the first network function, the second message including the subsequent temporary identifier for the second network function, and transmitting the subsequent container to the subsequent network function based on the subsequent temporary identifier.

In an aspect of the method, the number identifier indicates the first apparatus is to forward the number of containers identified in the number identifier to the first network function and store the other containers until it receives further routing information for routing other containers.

In an aspect of the method, the first apparatus is a radio access network (RAN).

In an aspect of the method, the first routing information is within a serving temporary mobile subscriber identifier for an NAS payload type (S-TMSI) for the first container targeted for the first network function and the subsequent routing information is within an S-TMSI for the subsequent container targeted for the subsequent network function.

In an aspect of the present disclosure, a method includes receiving, by the UE, a first message from a first apparatus, the first message including a first temporary identifier including routing information for a first non-access stratum (NAS) sublayer, a first container, and a subsequent temporary identifier including routing information for a subsequent NAS layer and a subsequent container, wherein the first container includes a first encrypted payload, and the subsequent container includes a subsequent encrypted payload, reading, by the UE, the first temporary identifier and the second temporary identifier, transmitting, by an access stratum (AS) layer of the UE, the first container to the first NAS sublayer based on the first temporary identifier, and transmitting, by the AS layer of the UE, the second container to the second NAS sublayer based on the second temporary identifier.

In an aspect of the present disclosure, a method includes receiving, by a first apparatus, a plurality of non access stratum (NAS) payloads, wherein a first NAS payload is received from a first network function and a second payload is received from a second network function, encrypting, by the first apparatus, the first payload with a first encryption generating a first encrypted payload, and the second payload with a second encryption generating a second encrypted payload, wherein the first encryption is associated with a first NAS container that is associated with first network function and the second encryption is associated with a second NAS container that is associated with second network function, generating, by the first apparatus, a first message that includes a first temporary identifier associated with the first network function and a first container, and a second temporary identifier associated with the second network function and a second container, wherein the first container includes the first encrypted payload, and the second container includes the second encrypted payload, and transmitting, by the first apparatus, the first message to a user equipment (UE). In an aspect of the method, the second network function is the same as the first network function.

In an aspect of the method, the second network function is a different network function than the first network function.

In an aspect of the present disclosure, a user equipment (UE) includes at least one processor, and at least one memory storing instructions which, when executed by the at least one processor, cause the UE at least to perform any of the foregoing methods.

In an aspect of the present disclosure, an apparatus includes at least one processor, and at least one memory storing instructions which, when executed by the at least one processor, cause the apparatus at least to perform any of the foregoing methods.

In an aspect of the present disclosure, a processor-readable medium storing instructions which, when executed by at least one processor of an apparatus, cause the apparatus at least to perform any of the foregoing methods.

According to some aspects, there is provided the subject matter of the independent claims. Some further aspects are defined in the dependent claims.

BRIEF DESCRIPTION OF THE DRAWINGS

Some example embodiments will now be described with reference to the accompanying drawings.

FIG. 3A is a diagram of an example distributed non access stratum (NAS) architecture, according to one illustrated aspect of the disclosure;

FIG. 3B is a diagram of another example distributed NAS architecture, according to one illustrated aspect of the disclosure;

FIG. 3C is a diagram of another example distributed NAS architecture, according to one illustrated aspect of the disclosure;

DETAILED DESCRIPTION

In the following description, certain specific details are set forth in order to provide a thorough understanding of disclosed aspects. However, one skilled in the relevant art will recognize that aspects may be practiced without one or more of these specific details or with other methods, components, materials, etc. In other instances, well-known structures associated with transmitters, receivers, or transceivers have not been shown or described in detail to avoid unnecessarily obscuring descriptions of the aspects.

Reference throughout this specification to "one aspect" or "an aspect" means that a particular feature, structure, or characteristic described in connection with the aspect is included in at least one aspect. Thus, the appearances of the phrases "in one aspect" or "in an aspect" in various places throughout this specification are not necessarily all referring to the same aspect. Furthermore, the particular features, structures, or characteristics may be combined in any suitable manner in one or more aspects.

Embodiments described in the present disclosure may be implemented in wireless networking apparatuses, such as, without limitation, apparatuses utilizing Worldwide Interoperability for Microwave Access (WiMAX), Global System for Mobile communications (GSM, 2G), GSM EDGE radio access Network (GERAN), General Packet Radio Service (GRPS), Universal Mobile Telecommunication System (UMTS, 3G) based on basic wideband-code division multiple access (W-CDMA), high-speed packet access (HSPA), Long Term Evolution (LTE), LTE-Advanced, enhanced LTE (eLTE), 5G New Radio (5G NR), 5G Advance, 6G (and beyond) and 802.11ax (Wi-Fi 6), among other wireless networking systems. The term 'eLTE' here denotes the LTE evolution that connects to a 5G core. LTE is also known as evolved UMTS terrestrial radio access (EUTRA) or as evolved UMTS terrestrial radio access network (EUTRAN).

The present disclosure may use the term "serving network device" to refer to a network node or network device (or a portion thereof) that services a UE. As used herein, the terms "transmit to," "receive from," and "cooperate with," (and their variations) include communications that may or may not involve communications through one or more intermediate devices or nodes. The term "acquire" (and its variations) includes acquiring in the first instance or reacquiring after the first instance. The term "connection" may mean a physical connection or a logical connection.

The present disclosure uses 5G NR as an example of a wireless network and may use smartphones and/or extended reality headsets as an example of UEs. It is intended and shall be understood that such examples are merely illustrative, and the present disclosure is applicable to other wireless networks and user equipment.

Figure 1:
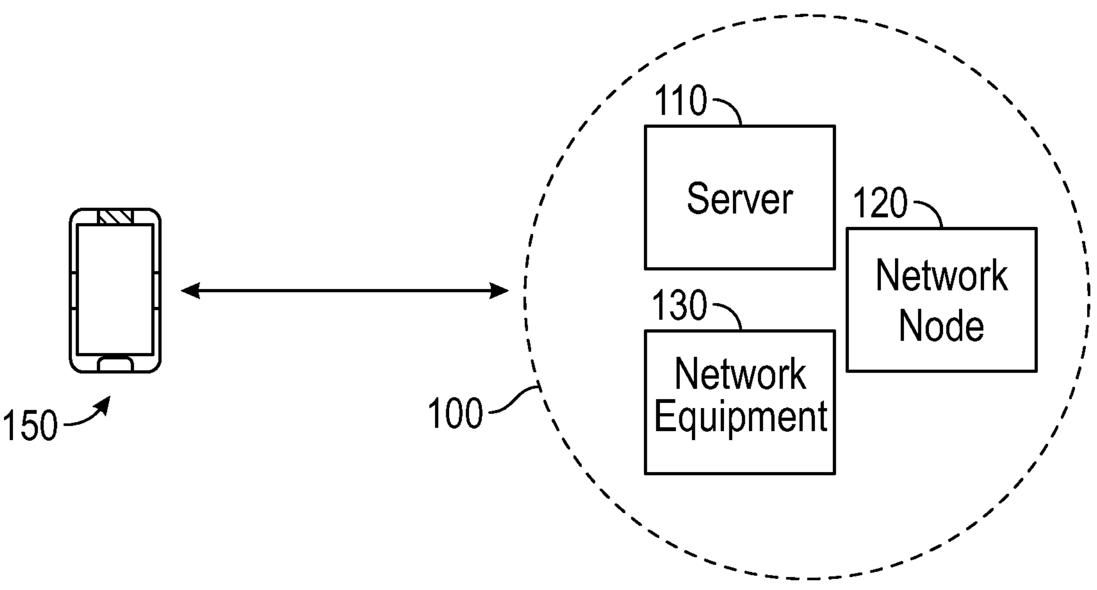
FIG. 1 is a diagram of an example embodiment of wireless networking between a network system and a user equipment (UE), according to one illustrated aspect of the disclosure.

FIG. 1 is a diagram depicting an example of wireless networking between a network system 100 and a user equipment (UE) 150. The network system 100 may include one or more network nodes 120, one or more servers 110, and/or one or more network equipment 130 (e.g., test equipment). The network nodes 120 will be described in more detail below. As used herein, the term "network apparatus" may refer to any component of the network system 100, such as the server 110, the network node 120, the network equipment 130, any component(s) of the foregoing, and/or any other component(s) of the network system 100. Examples of network apparatuses include, without limitation, apparatuses implementing aspects of 5G NR, among others. The present disclosure describes embodiments related to 5G NR and embodiments that involve aspects defined by 3rd Generation Partnership Project (3GPP). However, it is contemplated that embodiments relating to other wireless networking technologies are encompassed within the scope of the present disclosure.

The following description provides further details of examples of network nodes. In a 5G NR network, a gNodeB (also known as gNB) may include, e.g., a node that provides new radio (NR) user plane and control plane protocol terminations towards the ULE and that is connected via a NG interface to the 5G core (5GC), e.g., according to 3GPP TS 38.300 V16.6.0 (June 2021) section 3.2, which is hereby incorporated by reference herein.

A gNB supports various protocol layers, e.g., Layer 1 (L1)—physical layer, Layer 2 (L2), and Layer 3 (L3).

The layer 2 (L2) of NR is split into the following sublayers: Medium Access Control (MAC), Radio Link Control (RLC), Packet Data Convergence Protocol (PDCP) and Service Data Adaptation Protocol (SDAP), where, e.g.:

The physical layer offers to the MAC sublayer transport channels;

The MAC sublayer offers to the LLC sublayer logical channels;

The RLC sublayer offers to the PDCP sublayer RLC channels;

The PDCP sublayer offers to the SDAP sublayer radio bearers;

The SDAP sublayer offers to 5GC quality of service (QoS) flows;

Control channels include broadcast control channel (BCCH) and physical control channel (PCCH).

Layer 3 (L3) includes, e.g., radio resource control (RRC), e.g., according to 3GPP TS 38.300 V16.6.0 (June 2021) section 6, which is hereby incorporated by reference herein.

A gNB central unit (gNB-CU) includes, e.g., a logical node hosting, e.g., radio resource control (RRC), service data adaptation protocol (SDAP), and packet data convergence protocol (PDCP) protocols of the gNB or RRC and PDCP protocols of the en-gNB, that controls the operation of one or more gNB distributed units (gNB-DUs). The gNB-CU terminates the F1 interface connected with the gNB-DU. A gNB-CU may also be referred to herein as a CU, a central unit, a centralized unit, or a control unit.

A gNB Distributed Unit (gNB-DU) includes, e.g., a logical node hosting, e.g., radio link control (RLC), media access control (MAC), and physical (PHY) layers of the gNB or en-gNB, and its operation is partly controlled by the gNB-CU. One gNB-DU supports one or multiple cells. One cell is supported by only one gNB-DU. The gNB-DU terminates the F1 interface connected with the gNB-CU. A gNB-DU may also be referred to herein as DU or a distributed unit.

As used herein, the term "network node" may refer to any of a gNB, a gNB-CU, or a gNB-DU, or any combination of them. A RAN (radio access network) node or network node such as, e.g., a gNB, gNB-CU, or gNB-DU, or parts thereof, may be implemented using, e.g., an apparatus with at least one processor and/or at least one memory with processor-readable instructions ("program") configured to support and/or provision and/or process CU and/or DU related functionality and/or features, and/or at least one protocol (sub-)layer of a RAN (radio access network), e.g., layer 2 and/or layer 3. Different functional splits between the central and distributed unit are possible. An example of such an apparatus and components will be described in connection with FIG. 5 below.

The gNB-CU and gNB-DU parts may, e.g., be co-located or physically separated. The gNB-DU may even be split further, e.g., into two parts, e.g., one including processing equipment and one including an antenna. A central unit (CU) may also be called baseband unit/radio equipment controller/cloud-RAN/virtual-RAN (BBU/REC/C-RAN/V-RAN), open-RAN (O-RAN), or part thereof. A distributed unit (DU) may also be called remote radio head/remote radio unit/radio equipment/radio unit (RRH/RRU/RE/RU), or part thereof. Hereinafter, in various example embodiments of the present disclosure, a network node, which supports at least one of central unit functionality or a layer 3 protocol of a radio access network, may be, e.g., a gNB-CU. Similarly, a network node, which supports at least one of distributed unit functionality or a layer 2 protocol of the radio access network, may be, e.g., a gNB-DIJ.

A gNB-CU may support one or multiple gNB-DUs. A gNB-DU may support one or multiple cells and, thus, could support a serving cell for a user equipment (UE) or support a candidate cell for handover, dual connectivity, and/or carrier aggregation, among other procedures.

The user equipment (UE) 150 may be or include a wireless or mobile device, an apparatus with a radio interface to interact with a RAN (radio access network), a smartphone, an in-vehicle apparatus, an IoT device, or a M2M device, among other types of user equipment. Such UE 150 may include: at least one processor; and at least one memory including program code; where the at least one memory and the computer program code are configured to, with the at least one processor, cause the apparatus at least to perform certain operations, such as, e.g., RRC connection to the RAN. An example of components of a UE will be described in connection with FIG. 5. In embodiments, the UE 150 may be configured to generate a message (e.g., including a cell ID) to be transmitted via radio towards a RAN (e.g., to reach and communicate with a serving cell). In embodiments, the UE 150 may generate and transmit and receive RRC messages containing one or more RRC PDUs (packet data units). Persons skilled in the art will understand RRC protocol as well as other procedures a UE may perform.

With continuing reference to FIG. 1, in the example of a 5G NR network, the network system 100 provides one or more cells, which define a coverage area of the network system 100. As described above, the network system 100 may include a gNB of a 5G NR network or may include any other apparatus configured to control radio communication and manage radio resources within a cell. As used herein, the term "resource" may refer to radio resources, such as a resource block (RB), a physical resource block (PRB), a radio frame, a subframe, a time slot, a sub-band, a frequency region, a sub-carrier, a beam, etc. In embodiments, the network node 120 may be called a base station.

FIG. 1 provides an example and is merely illustrative of a network system 100 and a UE 150. Persons skilled in the art will understand that the network system 100 includes components not illustrated in FIG. 1 and will understand that other user equipment may be in communication with the network system 100.

Figure 2:
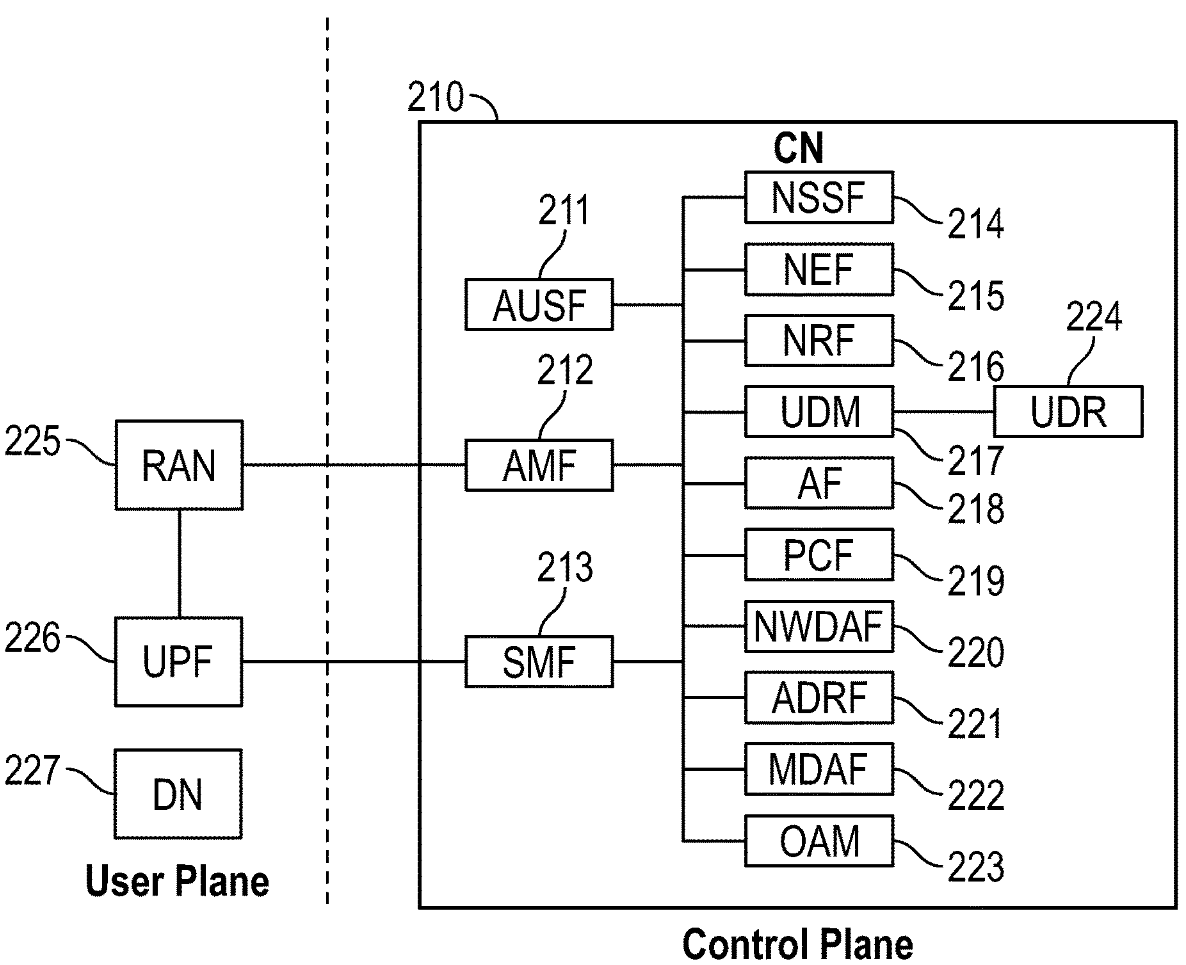
FIG. 2 is a diagram of example components of a network system, according to one illustrated aspect of the disclosure.

FIG. 2 is a block diagram of example components of the network system 100 of FIG. 1. A 5G NR network may be described as an example of the network system 100, and it is intended that aspects of the following description shall be applicable to other types of network systems, as well. The network system may operate in accordance with the signals and connections shown in FIG. 1 such that the UE 150 is in communication with the network system 100 through the radio access network 225. Additionally, the network system may be divided into user plane components and functions and control plane components and functions, as shown and described herein. Unless indicated otherwise, the terms "component", "function", and "service" may be used interchangeably herein, and they may refer to and be implemented by instructions executed by one or more processors.

Example functions of the components are described below. The example functions are merely illustrative, and it shall be understood that additional operations and functions may be performed by the components described herein. Additionally, the connections between components may be virtual connections over service-based interfaces such that any component may communicate with any other component. In this manner, any component may act as a service "producer," for any other component that is a service "consumer," to provide services for network functions.

For example, a core network 210 is described in the control plane of the network system. The core network 210 may include an authentication server function (AUSF) 211, an access and mobility function (AMF) 212, and a session management function (SMF) 213. The core network 210 may also include a network slice selection function (NSSF) 214, a network exposure function (NEF) 215, a network repository function (NRF) 216, and a unified data management function (UDM) 217, which may include a uniform data repository (UDR) 224.

Additional components and functions of the core network 210 may include an application function 218, policy control function (PCF) 219, network data analytics function (NWDAF) 220, analytics data repository function (ADRF) 221, management data analytics function (MDAF) 222, and operations and management function (GAM) 223.

The user plane includes the UE 150, a radio access network (RAN) 225, a user plane function (UPF) 226, and a data network (DN) 227. The RAN 225 may include one or more components described in connection with FIG. 1, such as one or more network nodes. However, the RAN 225 may not be limited to such components. The UPF 226 provides connection for data being transmitted over the RAN 225. The DN 226 identifies services from service providers, Internet access, and third party services, for example.

The AMF 212 processes connection and mobility tasks. The AUSF 211 receives authentication requests from the AMF 212 and interacts with UDM 217 to authenticate and validate network responses for determination of successful authentication. The SMF 213 conducts packet data unit (PDU) session management, as well as manages session context with the UPF 226.

The NSSF 214 may select a network slicing instance (NSI) and determine the allowed network slice selection assistance information (NSSAI). This selection and determination is utilized to set the AMF 212 to provide service to the UE 150. The NEF 215 secures access to network services for third parties to create specialized network services. The NRF 216 acts as a repository to store network functions to allow the functions to register with and discover each other.

The UDM 217 generates authentication vectors for use by the AUSF 211 and ADM 212 and provides user identification handling. The UDM 217 may be connected to the UDR 224 which stores data associated with authentication, applications, or the like. The AF 218 provides application services to a user (e.g., streaming services, etc.). The PCF 219 provides policy control functionality. For example, the PCF 219 may assist in network slicing and mobility management, as well as provide quality of service (QoS) and charging functionality.

The NWDAF 220 collects data (e.g., from the UE 150 and the network system) to perform network analytics and provide insight to functions that utilize the analytics in the providing of services. The ADRF 221 allows the storage, retrieval, and removal of data and analytics by consumers. The MDAF 222 provides additional data analytics services for network functions. The OAM 223 provides provisioning and management processing functions to manage elements in or connected to the network (e.g., UE 150, network nodes, etc.).

FIG. 2 is merely an example of components of a network system, and variations are contemplated to be within the scope of the present disclosure. In embodiments, the network system may include other components not illustrated in FIG. 2. In embodiments, the network system may not include every component illustrated in FIG. 2. In embodiments, the components and connections may be implemented with different connections than those illustrated in FIG. 2. Such and other embodiments are contemplated to be within the scope of the present disclosure.

Although further detail will be provided below, in a distributed non access stratum (NAS) architecture, multiple upper layer messages (e.g., NAS messages) are sent from a user equipment (UE) to multiple network functions (NFs) and vice versa using one lower layer message. In various embodiments, the NAS messages are transmitted via a single aggregated messages instead of multiple protocol data unit (PDU) transmissions.

For example, in various embodiments, in a distributed NAS architecture, a distributed security termination of various NAS functions may exist between the UE and the NAS function (e.g., network function NF). Accordingly, bidirectional communication may be enabled between the UE and any NF without involvement from another network function (e.g., a mobility management (MM) function.

For example, in some 5G systems, NAS messages may be used for signaling between the UE and Core Network, (e.g., UE and AMF). At the 5G core network, NAS Mobility Management (5GMM) procedures may keep track of the UE, registration and session establishment, as well as UE authentication and control integrity protection and ciphering for a certain UE. The 5GMM procedures are also used by the network to allocate temporary identities to the UE such as 5G-GUTI and also request identity information such as SUCI from the UE. Accordingly, described herein, in various embodiments, UE NAS communication may be effected directly between the UE and a target NF.

In various embodiments, a temporary identifier for an NF may be provided to the IE, such as during radio resource control (RRC) registration or during protocol data unit (PDU) communication establishment.

In a modular NAS with point to point (P2P) interfaces for a radio access network (RAN)-Core Network (CN) interface, a sender may transmit multiple NAS containers. Accordingly, an independent security termination enables orthogonality in devices in the network as well as the network itself. In various embodiments, a sender in the uplink (e.g., UE) or in the downlink (e.g., RAN) may transmit multiple NAS containers, secure (e.g., integrity protect and/or encrypt) each container independently and the receiver of the container differentiates the different NAS containers and processes them independently.

In various embodiments, an aggregated NAS container may be created that is applicable to various architecture variants that may be employed in a network (e.g., a 6G network), as will be described in further detail below. In various embodiments, multiple upper layer messages may be included in a single lower layer message within a modular NAS architecture.

As used herein, a communication with a radio access network (RAN) may refer to and mean a communication with a portion of a RAN, such as with a network node (e.g., a DU and/or a CU), or another portion of a RAN. As used herein, a communication with a core network may refer to and mean a communication with one or more services/applications of the core network, such as AMF or another service of a core network.

As used herein, the terms "first" and "second", or the like, may refer to a first or second instance of a message being transmitted/received by a component (e.g., UE, apparatus, etc.), or a first or second component in a sequence of described components. As such, the terms are used in a non-limiting manner, and can refer to any message, operation, device, component, or the like.

In accordance with the brief description, FIG. 3A is a diagram of an example distributed NAS architecture 300A, according to one illustrated aspect of the disclosure. In various embodiments, the distributed NAS architecture 300A includes a UE 150, a RAN 225, a mobility management (MM) function 315, a session management (SM) function 316 and a network function x (NFx) 317. It should be noted that the NFs described are exemplary only and any NFs may be utilized (e.g., NFs from FIG. 2) in the distributed architecture 300A. In various embodiments, although three NFs are described herein, any number of NFs may be utilized.

In various embodiments, an MM function 315 may provide tracking, registration, management, and authorization of network connections, as well as access to subscribed services for UEs, such as when roaming between base stations. An SM function 316, in various embodiments may manage data sessions and/or PDU sessions between a UE and the network as well as provide policy control for the sessions. In various embodiments, SM function may keeps track of PDU sessions and quality of service (QoS) flows in the 5GC for UEs and ensure synchronization of their states and statuses between NFs in the control and user planes. In various embodiments, an SM NF1 may handle PDU session 1, while SM NF2 may handle PDU session 2.

Also shown in FIG. 3A are a number of aggregated NAS containers (ANCs) 310 (e.g., 310A, 310B and 310C). Each ANC 310 includes information relating to an NAS sublayer and/or network function. In various embodiments, the containers may be formed, or generated, using information relating to that sublayer/network function. For example, in various embodiments, the containers 310 may include a payload and information relating to the payload for reading by an associated network function or NAS sublayer.

As shown in FIG. 3A, there are 3 containers (310A, 310B and 310C). On the UE side, container 310A may be a container for a first network function and may include routing information relating to the network functions associated with containers 310B and/or 310C as well as a payload for handling by that network function. Container 310B may be a container for a second network function and may include routing information relating to the network functions associated with containers 310A and/or 310C as well as a payload for handling by that network function. Container 310C may be a container for a third network function and may include routing information relating to the network functions associated with containers 310A and/or 310B as well as a payload for handling by that network function.

In various embodiments, for example, container 310A may be intended for the SM function 316, container 310B may be intended for the MM function 315 and container 310C may be intended for the NFx function 317. It should be noted that the NFx function may include any NF, and is an example of any network function x.

Accordingly, for an uplink communication, the UE 150 creates a message, which in various embodiments is an ANC, for transmission that includes the three example containers 310 and transmits the ANC to the RAN 225. In various message embodiments described below, a semicolon ";" may indicate a separation between containers in the message. Accordingly, in various embodiments, the ANC may be created, or formed in accordance with the following: ANC=clear [MM-S-TMSI]; (I&E using MM keys[MM parameters], SM-S-TMSI, NFx-S-TMSI); (I&E using SM keys [SM parameters]); (I&E using NFx keys [NFx parameters]). The clear indication is a first routing information for a first NF location (e.g., the MM 315) and includes the MM servicing-mobile subscriber temporary identifier (S-TMSI). In various embodiments, a clear indication does not include integrity protection or encryption. Accordingly, in various embodiments, the first container is transmitted in the clear and includes routing information for subsequent containers.

In the above example, the RAN 225 routes the ANC to the MM 315, which is able to read the information [MM parameters] in the second container 310B that utilizes integrity and encryption (I&E) keys specific to the MM 215. The second container 310B then also includes the SM-S-TMSI and NFx-S-TMSI routing information for the MM 315 to forward/transmit the subsequent containers to those network functions. That is, the MM 315 forward the first container 310A to the SM 316 and the third container 310C to the NFx 317, each NF which is able to integrity check and decipher the contents of the container based upon the respective I&E keys of those network functions.

In the downlink communication direction, the ANC may be formed, or generated, by for example, the RAN or the MM 315. In this direction, key set identifiers (KSIs) for the NFs may be utilized to provide a sublayer of the UE to integrity check and decipher the information contained in each individual container (310A, 310B, 310C). For example, in an embodiment, the MM 315 may form the ANC in accordance with the following: I using MM Keys [KSI]; (I&E using MM keys[MM parameters], KSIsm, KSInfx); (I&E using SM keys [SM parameters]); (I&E using NFx keys [NFx parameters]). In another example embodiment, the MM 315 may form the ANC in accordance with the following: I using MM Keys [KSI]; (I&E using MM keys [MM parameters], NFx-S-TMSI); (I&E using NFx keys [NFx parameters]).

In various embodiments, the KSIs identify NAS security contexts established between the UE and the NFs. A single NF may have more or more KSIs. The UE uses the received KSI to identify the associated NAS security context and use it to perform integrity checking and deciphering of the received associated container.

Accordingly, when the UE 150 receives the ANC, the UE is able to forward each individual container to an associated sublayer based upon the KSI or S-TMSI for network function.

In accordance with the brief description, FIG. 3B is a diagram of an example distributed NAS architecture 300B, according to one illustrated aspect of the disclosure. In various embodiments, the distributed NAS architecture 300B includes a UE 150, a RAN 225, an MM function 315, an SM function 316 and an NFx 317. It should be noted that the NFs described are exemplary only and any NFs may be utilized (e.g., NFs from FIG. 2) in the distributed architecture 300B. An additional network function NN 318, which may be a network function that is a target network function for routing the containers 310 is included in FIG. 3B.

As shown in FIG. 3B, there are 3 containers (310A, 310B and 310C) shown for 3 network functions. On the UE side, container 310A may be a container for a first network function and may include a payload for handling by that network function. Container 310B may be a container for a second network function and may include a payload for handling by that network function. Container 310C may be a container for a third network function and may a payload for handling by that network function. Additionally, a container may be included that is transmitted in the clear for a network function (e.g., NN) that includes parameters for that network function as well as routing information for containers 310A, 310B and 310C.

In various embodiments, for example, container 310A may be intended for the SM function 316, container 310B may be intended for the MM function 315 and container 310C may be intended for the NFx function 317. It should be noted that the NFx function may include any NF, and is an example of any network function x.

Accordingly, for an uplink communication, the UE 150 creates a message, which in various embodiments is an ANC, for transmission that includes the three example containers 310 as well as a container for the NN NF, and transmits the ANC to the RAN 225. In various embodiments, the ANC may be created, or formed in accordance with the following: ANC=clear [NN-S-TMSI]; (I&E using NN keys[NN parameters], SM-S-TMSI, MM-S-TMSI, NFx-S-TMSI); (I&E using SM keys [SM parameters]); (I&E using MM keys [MM parameters]); (I&E using NFx keys [NFx parameters]).

In the above example, the RAN 225 routes the ANC to the NN 318, which is able to read the information [NN parameters] using its own I&E keys, as well as the routing information for subsequent containers that are included in a container for the NN NF. The NN then routes the first container 310A to the SM 316, the second container 310B to the MM 315 and the third container 310C to the NFx 317. The SM is able to read the information contained in the first container that utilizes integrity and encryption (I&E) keys specific to the SM 316. The second container 310B is read by the MM 315 based upon integrity and encryption (I&E) keys specific to the MM 315, and the third container is read by the NFx 317 based upon the integrity and encryption (I&E) keys specific to the NFx 317.

In the downlink communication direction, the ANC may be formed, or generated, by for example, the NN 318. In this direction, key set identifiers (KSIs) for the NFs may be utilized to provide a sublayer of the UE to integrity check and decipher the information contained in each individual container (310A, 310B, 310C) as well as the NN container.

In various embodiments, one or more PDU sessions per SM NFs may be utilized based on security information changes. In an embodiment, the NN 318 may form the ANC in accordance with the following: I using NN Keys [KSInn] (I&E using NN keys (KSIsm, KSImm, KSI NFx)); (I&E using SM keys [SM parameters]); (I&E using MM keys [MM parameters]); (I&E using NFx keys [NFx parameters]). In various embodiments, KSIsm may be used in a case where there are multiple PDU Sessions per SM NFx but independent KSI values for each PDU Session. KSIsm can also be used irrespective of whether a single or multiple PDU Sessions per SM NFx exists.

In an embodiment, the NN 318 may form the ANC in accordance with the following: I using NN Keys [KSInn] (I&E using NN keys (SM-S-TMSI) (I&E using SM keys [SM parameters]). In various embodiments, an SM-S-TMSI can be used in case a single KSI applies for a single SM NF supporting one or more PDU sessions for a given UE.

Accordingly, when the UE 150 receives the ANC, the UE is able to forward each individual container to an associated sublayer based upon the KSI for network function.

In accordance with the brief description, FIG. 3C is a diagram of an example distributed NAS architecture 300C, according to one illustrated aspect of the disclosure. In various embodiments, the distributed NAS architecture 300C includes a UE 150, a RAN 225, an MM function 315, an SM function 316 and an NFx 317. It should be noted that the NFs described are exemplary only and any NFs may be utilized (e.g., NFs from FIG. 2) in the distributed architecture 300C.

Again, as shown in FIG. 3C, there are 3 containers (310A, 310B and 310C). On the UE side, container 310A may be a container for a first network function and may include a payload for handling by that network function. Container 310B may be a container for a second network function and may include routing information relating to the network functions associated with containers 310A and 310C as well as a payload for handling by that network function. Container 310C may be a container for a third network function and may include a payload for handling by that network function.

In various embodiments, for example, container 310A may be intended for the SM function 316, container 310B may be intended for the MM function 315 and container 310C may be intended for the NFx function 317. It should be noted that the NFx function may include any NF, and is an example of any network function x.

Accordingly, for an uplink communication, the UE 150 creates a message, which in various embodiments is an ANC, for transmission that includes the three example containers 310 and transmits the ANC to the RAN 225. In various embodiments, the ANC may be created, or formed in accordance with the following: clear [temporary identifier, n or flag](I&E using MM keys (MM parameters, SM-S-TMSI, NFx-S-TMSI); (I&E using SM keys [SM parameters]) (I&E using NFx keys [NFx parameters]).

In various embodiments, the n or flag identifier may indicate to the RAN 225 how to handle the ANC containers. In an example, the n or flag identifier may indicate to the RAN 225 to forward containers that follow the routing information right away and store other containers. For example, the RAN 225 may forward, or transmit the second container 310B to the MM 315. Upon receipt of the second container 310B, the MM 315 may read the routing information for the first and third containers 310A and 310C, respectively, and return that information to the RAN 225, at which point the RAN 225 may forward the first container 310A to the SM 316 and the third container 310C to the NFx 317.

In various embodiments, if the RAN 225 receives a negative acknowledgement (e.g., from the MM 315), the RAN 225 may discard the stored containers.

In another embodiment, the flag identifier may indicate to the RAN 225 to forward all containers immediately or forward only one container that follows the routing information right away based on the routing information available to their respective NFs.

In various embodiments, the ANC may be created, or formed in accordance with the following: ANC=clear [temporary identifier 1]; (I&E using SM keys[SM parameters]; [temporary identifier 2]; (I&E using MM keys [MM parameters]); [temporary identifier 3]; (I&E using NFx keys [NFx parameters]). In this case, the RAN 225 forwards container 310A to the SM 316, container 310B to MM 315, and container 310C to the NFx 317. Accordingly, each NF is able to integrity check and decipher the contents of the container based upon the respective routing identifier contained in the containers to identify the security context/keys for those network functions.

In various embodiments, the ANC may be formed as follows: ANC=clear [temporary identifier, n or flag]; (I&E using MM keys (MM parameters, NF x-S-TMSI, NF y S-TMSI); (I&E using NF x keys [NF x parameters]); (I&E using NF y keys [NF y parameters]). In various embodiments, n may indicate to forward n containers that follow the routing information immediately and to store other containers. In various embodiments, the flag may indicated to forward all containers right away or forward only one container that follows the routing information right away based on the routing information available.

In various embodiments, the ANC may be formed as follows: ANC=clear [MM-S-TMSI, n or flag](I&E using NN keys[MM parameters], SM-S-TMSI, LM-S-TMSI); (I&E using SMx keys [SMx parameters]) (I&E using LMx keys [LMx parameters]). The MM NF may decrypt the MM container and shares the SM-S-TMSI-1, SM-S-TMSI-2 to the RAN. The RAN may then use the SM-S-TMSI-1 to forward the SM container-1 to the SM NF-1 and similarly to SM-NF-2.

In various embodiments, the ANC may be formed as follows: ANC=clear [temporary identifier 1]; (I&E using MM keys (MM parameters); [temporary identifier 2](I&E using NFx keys) (NFx parameters). The RAN may forward the respective containers to the NFx instance based on the routing information present in the temporary identifier that precedes the container.

In the downlink, the RAN 225 transmits a single RRC message including multiple NAS containers (e.g., 310A, 310B and 310C), forming the message in accordance with the following: (I using MM keys (KSImm)); (I&E using MM keys [MM parameters]); (I using SM keys (KSIsm) (I&E using SM keys [SM parameters]); (I using NFx keys (KSIsm)); (I&E using SM keys [NFx parameters]).

In various embodiments, the MM NF message may be formed as follows: MM NF=(I using MM-S-TMSI) (I&E using MM keys [MM parameters]); and an SM NFx message may be formed as follows: SM NF x=(I using SM Keys (x-S-TMSI)); (I&E using SMx keys [SMx parameters]). As per the above, a number (n) may indicate to forward n containers that follow the routing information immediately while storing other containers, while a flag indicator may indicate by one value a forwarding of all containers immediately or by another value a forwarding only one container that follows the routing information immediately based on the routing information available.

Accordingly, when the UE 150 receives the ANC, the UE is able to forward each individual container to an associated sublayer based upon the KSI or S-TMSI for the network function.

Figure 4A:
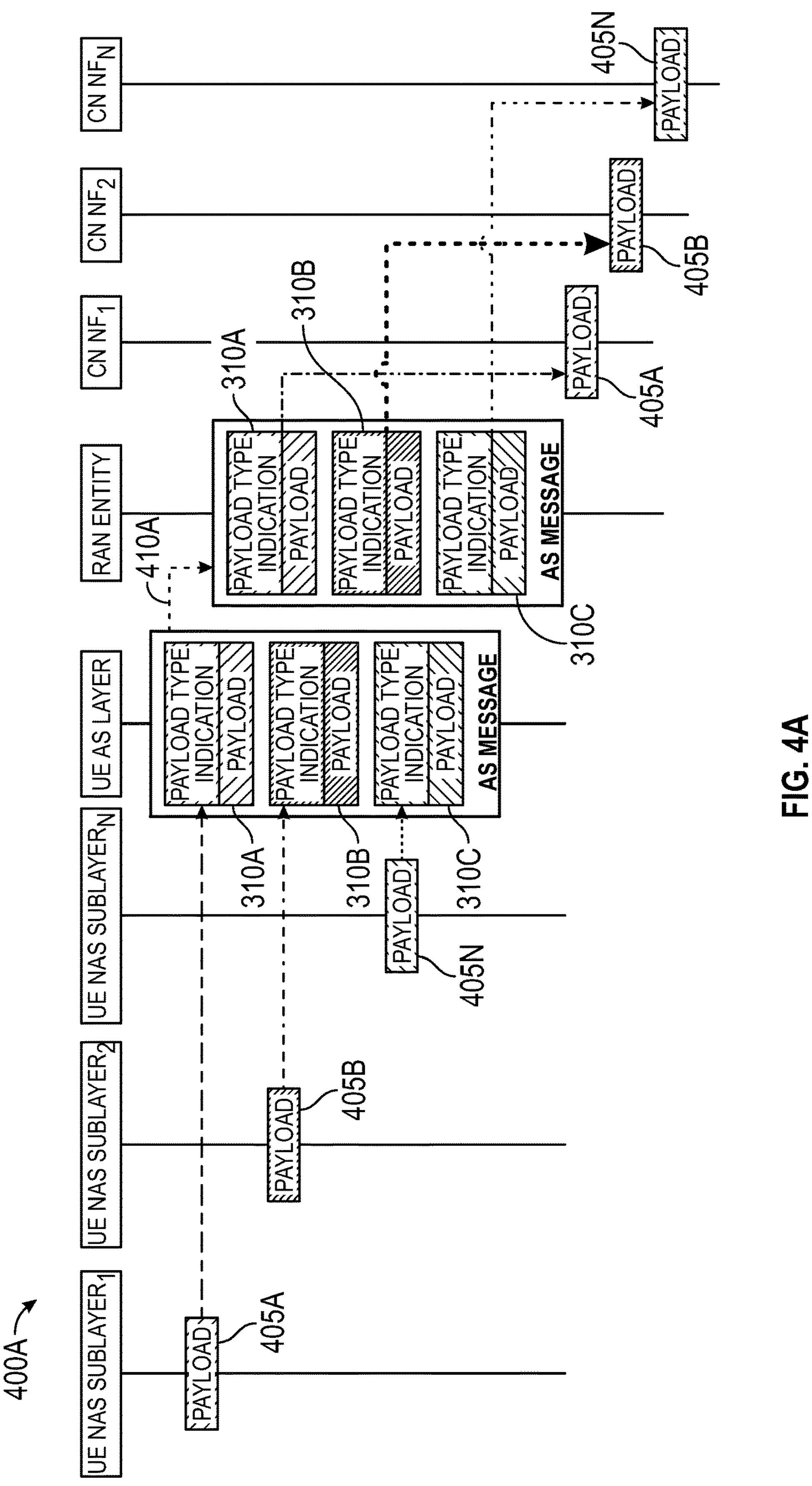
FIG. 4A is a diagram of an example uplink transmission embodiment of signals and operations among UE NAS sublayers, a UE access stratum layer, a RAN, and core network functions (CN NFs), according to one illustrated aspect of the disclosure.

In accordance with the brief description, FIG. 4A is a diagram of an example uplink transmission embodiment 400A of signals and operations among UE NAS sublayers, a UE access stratum layer, a RAN, and core network functions (CN NFs), according to one illustrated aspect of the disclosure.

As shown in FIG. 4A, each UE NAS sublayer (e.g., sublayer 1, sublayer 2, and sublayer n) generates a payload/data and forwards the payload to the UE access stratum (AS) layer. In various embodiments, payload 405A is provided by UE NAS sublayer 1, payload 405B is provided by UE NAS sublayer 2, and payload 405*n* is provided by UE NAS sublayer n. The UE AS layer then generates the containers described above (e.g., 310A, 310B and 310C) and generates an ANC for transmission to the RAN at operation 410A, which receives the ANC. The RAN then forwards each container to the respective CN NF (e.g., NF1, NF2, and NFn), which deciphers the information in their respective container (e.g., payloads 405A, 405B and 405C).

In various embodiments, an NAS container may include upper layer content from the UE AS perspective associated with a respective CN NF, such as an NAS MM container, NAS SM container, NAS short message service container, NAS location management container, NAS policy control container, and/or NAS home network container for information exchange between a UE and home network.

In various embodiments, the NAS container type indication may be created based on which UE NAS sublayer has sent the container(s), and/or a network function differentiator (e.g. an SMx differentiator), if applicable.

Figure 4B:
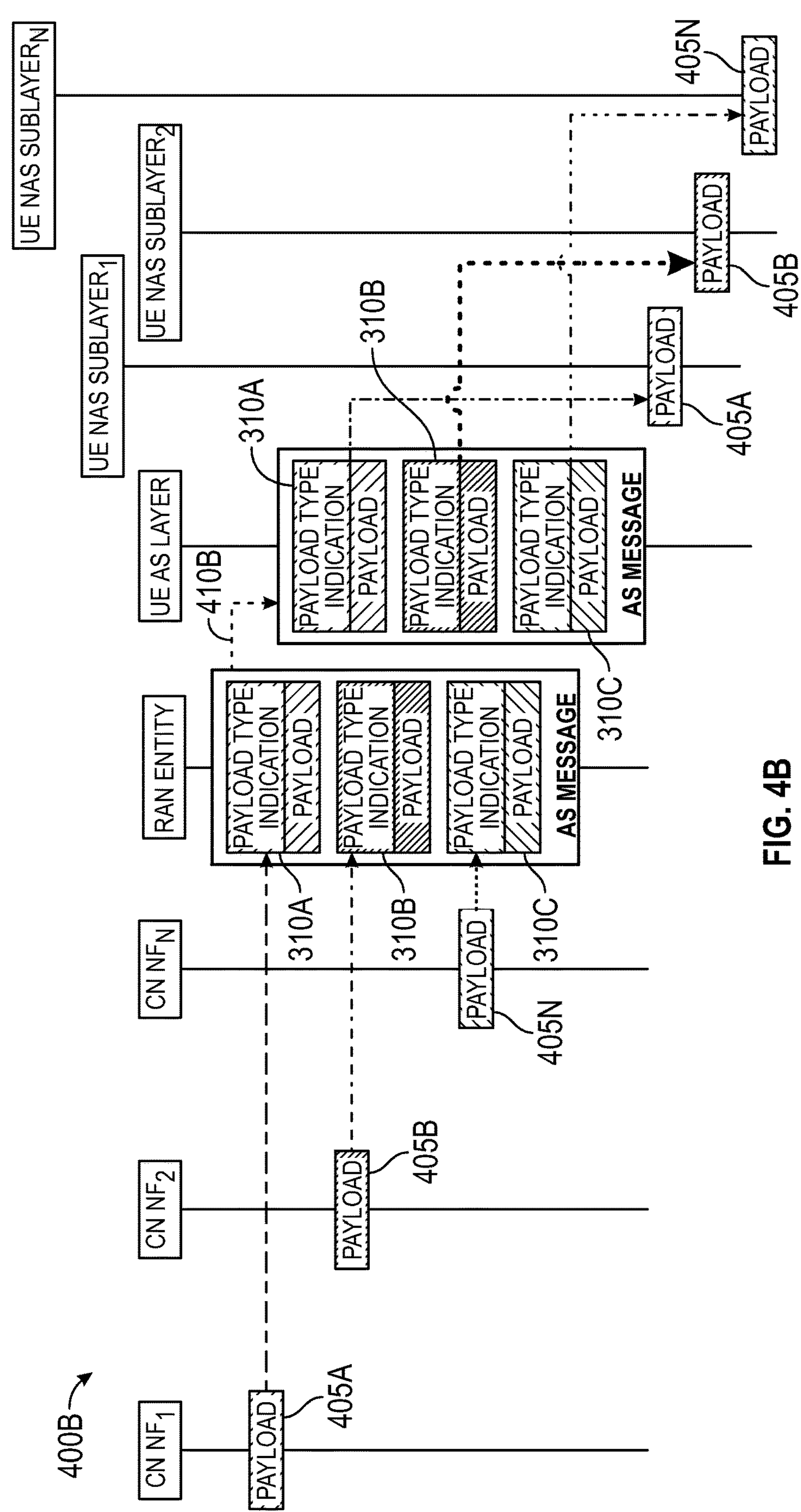
FIG. 4B is a diagram of an example downlink transmission embodiment of signals and operations among UE NAS sublayers, a UE access stratum layer, a RAN, and CN NFs, according to one illustrated aspect of the disclosure.

In accordance with the brief description, FIG. 4B is a diagram of an example downlink transmission embodiment 400B of signals and operations among UE NAS sublayers, a UE access stratum layer, a RAN, and CN NFs, according to one illustrated aspect of the disclosure.

As shown in FIG. 4B, each CN NF (e.g., NF1, NF2, and NFn), generates a payload/data and forwards the payload to the UE access stratum (AS) layer. In various embodiments, payload 405A is provided by CN NFL, payload 405B is provided by CN NF2, and payload 405*n* is provided by CN NFn. The NF then generates the containers described above (e.g., 310A, 310B and 310C) and the RAN generates an RRC message (or other AS message) for transmission to the UE at operation 410B, which receives the RRC message. The RAN then forwards each container to the respective UE NAS sublayer (e.g., sublayer 1, sublayer 2, and sublayer n) which deciphers the information in their respective container (e.g., payloads 405A, 405B and 405C).

In various embodiments, alternate example formats for forming the messages and containers described above are described herein below. In various embodiments, the notation may be indicated as follows: XX{ . . . } may indicated the contents of { . . . } are NAS Container Integrity Protected w/ NAS XX Keys, and XX[ . . . ] may indicate the contents of [ . . . ] are NAS Container Integrity & Confidentiality Protected w/ NAS XX Keys. Data without { } or [ ] enclosing it may indicate it is sent in the clear (e.g., no integrity protection nor encryption). R=Routing Information & C=Container Data which may include routing data.

Accordingly, a generic format described below may include { . . . } or [ . . . ] without any superscripts or with superscripts. R=Routing Information & C=Container Data.

For example:

{R},[C1+R2],[C2] indicates that R is integrity protected, C1+R2 is integrity/encryption protected and C2 is also integrity/encryption protected, R,[C1],[C2] indicates that R is sent in the clear, C1 is integrity/encryption protected and C2 is also integrity/encryption protected, R+Flag,[C1],[C2] indicates that R+Flag is sent in the clear, C1 is integrity/encryption protected and C2 is also integrity/encryption protected.

Accordingly, an alternative example embodiment with respect to FIG. 3A may include:

For the Uplink:

UE to RAN: RMM, MM[MM Data+RSM+RXX], SM[SM Data], XX[XX Data]. Generic format R1,[C1+R2+Rx],[C2],[Cx].

RMM is sent in clear from UE to RAN.

RAN to MM NF: MM[MM Data+RSM+RXX], SM[SM Data], XX[XX Data]. Generic format [C1+R2+Rx],[C2],[Cx].

RAN uses RMM to route all containers to MM NF. RAN provides RMM to MM NF via NAS Transport layer (e.g. P2P or SBI/HTTP) to enable MM NF identify UE's MM Context MM NF to XX NF: XX[XX Data]. Generic format of [C].

MM NF extracts Routing Information RSM+RXX from received MM[MM Data+RSM+RXX] to route remaining received containers onwards to respective NFs.

MM NF uses RSM to route SM[SM Data] to SM NF & Rxx to route XX[XX Data] to XX NF.

MM NF provides RSM to SM NF & Rxx to XX NF via NAS Transport layer e.g. SBI/HTTP to enable SM NF, XX NF identify UE's SM, XX Contexts respectively.

For the Downlink:

SM NF to MM NF: RSM, SM[SM Data] or XX NF to MM NF: Rxx, xx[XX Data]. Generic format R,[C].

MM NF to RAN: MM{RMM}, MM[MM Data+RSM+RXX], SM[SM Data], XX[XX Data]. Generic format {R1},[C1+R2+Rx],[C2],[Cx].

RAN to UE: MM{RMM}, MM[MM Data+RSM+RXX], SM[SM Data], XX[XX Data]. Generic format {R1}, [C1+R2+Rx],[C2],[Cx].

An alternative example embodiment with respect to FIG. 3B may include:

For the Uplink:

UE to RAN: RNN, NN[NN Data-+RMM+RSM+RXX], MM[MM Data], SM[SM Data], XX[XX Data]. Generic format R1,[C1+R2+R3+Rx],[C2],[C3],[Cx]

RNN is sent in clear from UE to RAN.

RAN to NN NF: NN[NN Data+RMM+RSM+RXX], MM[MM Data], SM[SM Data], XX[XX Data]. Generic format [C1+R2+R3+Rx],[C2],[C3],[Cx].

RAN uses RNN received from UE to route all containers to NN NF. RAN provides RNN to NN NF via NAS Transport layer (e.g. P2P or SBI/HTTP) to enable NN NF identify UE's NN Context.

NN NF to XX NF: XX[XX Data]. Generic format for [C].

NN NF extracts Routing Information RMM+RSM+RXX from received NN[NN Data+RMM+RSM+RXX] to route received containers onwards to respective NFs.

NN NF uses RMM to route MM[MM Data] to MM NF, RSM to route SM[SM Data] to SM NF & Rxx to route XX[XX Data] to XX NF.

NN NF provides RMM to MM NF, RSM to SM NF & Rxx to XX NF via NAS Transport layer (e.g. SBI/HTTP) to enable MM NF, SM NF, XX NF identify UE's MM, SM, XX Contexts respectively.

For the Downlink:

MM NF to NN NF: RMM, MM[MMM Data] or SM NF to NN NF: RSM, SM[SM Data] or XX NF to NN NF: Rxx, xx[XX Data]. Generic format R,[C].

NN NF to RAN: NN{RNN}, NN[NN Data+RMM+RSM+RXX], MM[MM Data], SM[SM Data], XX[XX Data]. Generic format {R1}[C1+R2+R3+Rx][C2],[C3],[Cx].

RAN to UE: NN{RNN}, NN[NN Data+RMM+RSM+RXX], MM[MM Data], SM[SM Data], XX[XX Data]. Generic format {R1}[C1+R2+R3+Rx][C2],[C3],[Cx].

An alternative example embodiment with respect to FIG. 3B may include:

For the Uplink:

RRC Unprotected:

UE to RAN: RMM+Flag, MM[MM Data+RSM+Rxx], SM[SM Data], XX[XX Data]. Generic format R1+Flag,[C1+R2+Rx],[C2],[Cx].

RAN to MM NF: MM[MM Data+RSM+Rxx]. Generic format [C1+R2+Rx]

RAN uses the RMM+Flag information to route the number of containers indicated by Flag to MM NF.

If Flag is present then only first container MM[MM Data-+RSM+Rxx] is sent to MM NF.

If Flag is not present then ALL containers shall be sent to MM/NN NF i.e. MM[MM Data+RSM+Rxx], SM[SM Data], XX[XX Data](this applies to Arch Option A&B). In case where Flag is present, RAN shall attempt delivery of MM Container first and wait for acknowledgement from MM NF to return Routing Information (RSM/Rxx) to RAN, remaining container shall be buffered by RAN.

RAN provides RMM to MM NF via NAS Transport layer (e.g. SBI/HTTP) to enable MM NF identify UE's MM Context.

RAN to XX NF: Generic format for [C].

If a negative acknowledgement is received from MM NF, RAN may drop all remaining buffered/stored containers.

If a positive acknowledgement is received from the MM NF, RAN may use the received Routing Information (RSM/Rxx) to attempt delivery of remaining buffered containers respectively. For example, the RAN uses RSM to route SM[SM Data] to SM NF and uses Rxx to route XX[XX Data] to XX NF. The RAN may attempt delivery of these respective containers concurrently.

The RAN provides RSM/Rxx to SM NF/XX NF respectively via the NAS transport layer (e.g. SBI/HTTP) to enable SM NF/XX NF identify UE's SM/XX Context respectively.

For an RRC protected option:

For the Uplink:

UE to RAN: RMM, RSM, RXX, MM[MM Data], SM[SM Data], XX[XX Data]: Generic Format: R1, R2, Rx,[C1],[C2],[Cx].

Or RMM, MM[MM Data], RSM, SM[SM Data], RXX, XX[XX Data]. Generic Format: R1,[C1], R2,[C2], Rx,[Cx].

RAN to MM NF or SM NF or XX NF: MM[MM Data] or SM[SM Data] or XX[XX Data]: Generic Format: [C1] or [C2] or [Cx].

RAN shall use the received routing information RMM, RSM, RXX to determine the NF to which each container shall be delivered.

RAN provides RMM/RSM/Rxx to MMNF/SM NF/XX NF respectively via NAS transport layer (e.g. SBI/HTTP) to enable MM NF/SM NF/XX NF identify UE's MMI/SM/XX context respectively.

The order of routing information may correspond to the order of the containers or alternatively the routing information/container may be ordered in pairs.

In an embodiment, if an MM Container is present, the RAN may attempt delivery of Ma container first and wait for acknowledgement from MM NF before attempting delivery of remaining containers which are buffered at the RAN. If a negative acknowledgement is received from MM NF, RAN may drop all remaining buffered containers.

If an MM container is present and if a positive acknowledgement received, the RAN may attempt delivery of remaining buffered containers. The RAN may attempt delivery of these respective containers concurrently.

For the Downlink:

MM NF to RAN: MM{RMM}, MM[MM Data]. Generic Format: {R},[C].

SM NF to RAN: SM{RSM}, SM[SM Data]. Generic Format: {R},[C].

XX NF to RAN: XX{RXX}, XX[XX Data]. Genetic Format: {R},[C].

Where R information may be either XX-S-TMSI (Temporary Identifier) or aKSIxx (Security Context Identifier).

RAN to UE: MM{RMM}, MM[MM Data], SM{RSM}, SM[SM Data], XX{RXX}, XX[XX Data]. Generic Format: {R1},[C1], {R2},[C2], {Rx},[Cx].

The following describes operations from the perspective of an uplink UE. From such a perspective, a method may include receiving, at an AS layer of a user equipment (UE), a plurality of NAS payloads, wherein a first NAS payload is received from a first NAS sublayer and a subsequent payload is received from a subsequent NAS sublayer, encrypting, by the UE, the first payload with a first encryption generating a first encrypted payload and the subsequent payload with a subsequent encryption generating a subsequent encrypted payload, wherein the first encryption is associated with a first network function and the subsequent encryption is associated with a subsequent network function, generating, by the UE, a first message that includes a first temporary identifier comprising of routing information for the first network function and a first container, and a subsequent container, wherein the first container includes the first encrypted payload and the subsequent container includes the subsequent encrypted payload, and transmitting the first message to a first apparatus.

The following describes operations from the perspective of downlink UE. From such a perspective, a method may include receiving, by the UE, a first message from a first apparatus, the first message including a first temporary identifier including routing information for a first non-access stratum (NAS) sublayer, a first container, and a subsequent temporary identifier including routing information for a subsequent NAS layer and a subsequent container, wherein the first container includes a first encrypted payload, and the subsequent container includes a subsequent encrypted payload, reading, by the UE, the first temporary identifier and the second temporary identifier, transmitting, by an access stratum (AS) layer of the UE, the first container to the first NAS sublayer based on the first temporary identifier, and transmitting, by the AS layer of the UE, the second container to the second NAS sublayer based on the second temporary identifier.

The following describes operations from the perspective of an uplink apparatus. From such a perspective, a method may include receiving, by a first apparatus, a first message from a user equipment (UE), the first message including a first temporary identifier comprising routing information for forwarding a first non access stratum (NAS) container, a first container and a subsequent container, wherein the first container includes a first encrypted payload, and the subsequent container includes a subsequent encrypted payload and subsequent temporary identifier comprising routing information for forwarding the subsequent network function. The first apparatus reads at least the first routing information, and transmits the first container to the first network function based on the first temporary identifier.

The following describes operations from the perspective of downlink apparatus. From such a perspective, a method may include receiving, by a first apparatus, a plurality of non access stratum (NAS) payloads, wherein a first NAS payload is received from a first network function and a second payload is received from a second network function. The first apparatus encrypts the first payload with a first encryption and the second payload with a second encryption, wherein the first encryption is associated with a first NAS container that is associated with first network function and the second encryption is associated with a second NAS container that is associated with second network function, generates a first message that includes a first temporary identifier associated with the first network function and a first container, and a second temporary identifier associated with the second network function and a second container, wherein the first container includes the first encrypted payload, and the second container includes the second encrypted payload, and transmits the first message to a user equipment (UE).

Figure 5:
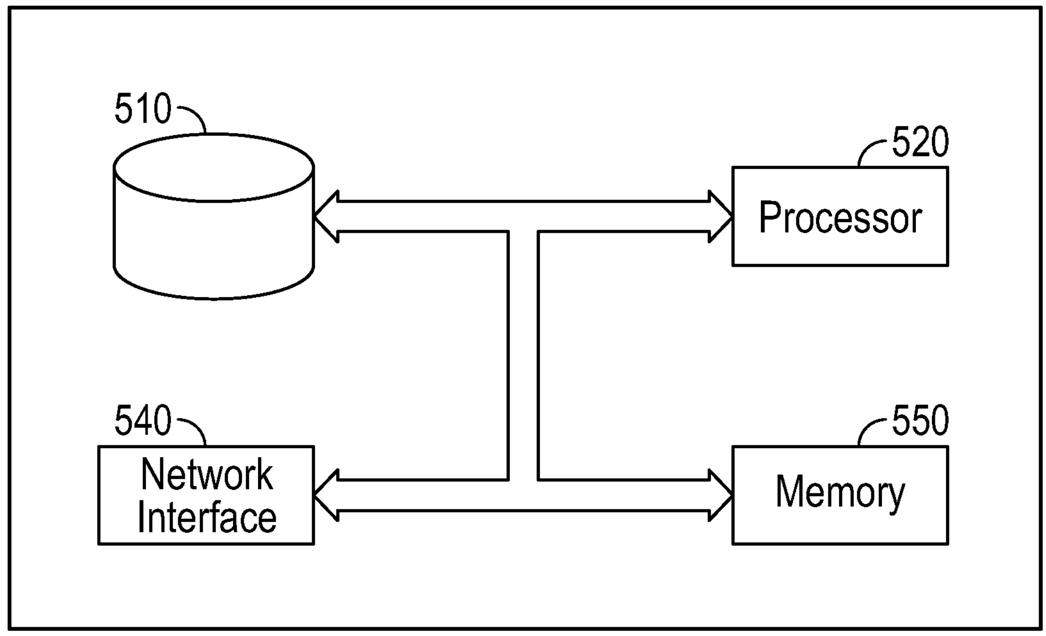
FIG. 5 is a diagram of an example embodiment of components of a UE or of a network apparatus, according to one illustrated aspect of the present disclosure.

Referring now to FIG. 5, there is shown a block diagram of example components of a UE or a network apparatus (e.g., of a RAN or a core network). The apparatus includes an electronic storage 510, a processor 520, a network interface 540, and a memory 550. The various components may be communicatively coupled with each other. The processor 520 may be and may include any type of processor, such as a single-core central processing unit (CPU), a multi-core CPU, a microprocessor, a digital signal processor (DSP), a System-on-Chip (SoC), or any other type of processor. The memory 550 may be a volatile type of memory, e.g., RAM, or a non-volatile type of memory, e.g., NAND flash memory. The memory 550 includes processor-readable instructions that are executable by the processor 520 to cause the apparatus to perform various operations, including those mentioned herein, such as the operations described in FIGS. 3A-4B.

The electronic storage 510 may be and include any type of electronic storage used for storing data, such as hard disk drive, solid state drive, optical disc, and/or other non-transitory computer-readable mediums, among other types of electronic storage. The electronic storage 510 stores processor-readable instructions for causing or configured for causing the apparatus to perform its operations and also stores data associated with such operations, such as storing data relating to 5G NR standards, among other data. The network interface 540 may implement wireless networking technologies such as 5G NR and/or other wireless networking technologies.

The components shown in FIG. 5 are merely examples, and persons skilled in the art will understand that an apparatus includes other components not illustrated and may include multiples of any of the illustrated components. Such and other embodiments are contemplated to be within the scope of the present disclosure. For example, a transmitter and a receiver may be included as components for transmitting and receiving signals.

Further embodiments of the present disclosure include the following examples.

Example 1.1

A UE, comprising:

means for receiving, at an access stratum (AS) layer of a user equipment (UE), a plurality of non access stratum (NAS) payloads, wherein a first NAS payload of the plurality of NAS payloads is received from a first NAS sublayer and a subsequent payload of the plurality of NAS payloads is received from a subsequent NAS sublayer;

means for encrypting, by the UE, the first payload with a first encryption generating a first encrypted payload and the subsequent payload with a subsequent encryption generating a subsequent encrypted payload, wherein the first encryption is associated with a first network function and the subsequent encryption is associated with a subsequent network function; means for generating, by the UE, a first message that includes a first temporary identifier comprising of routing information for the first network function and a first container, and a subsequent container, wherein the first container includes the first encrypted payload and the subsequent container includes the subsequent encrypted payload; and means for transmitting, by the UE, the first message to a first apparatus.

Example 1.2

The UE of example 1.1, wherein the first message includes a flag identifier that identifies that the first apparatus is to forward the first container to the first network function based on the first temporary identifier comprising of the routing information and the subsequent containers to the subsequent network functions based on the subsequent temporary identifiers comprising of routing information for those network functions.

Example 1.3

The UE of example 1.1, wherein the first message includes a flag identifier that identifies that the first apparatus is to forward the first container to the first network function based on the first routing information and store the subsequent containers.

Example 1.4

The UE of example 1.1, wherein the first message includes an indicator number that indicates the first apparatus is to forward the indicated number of containers to the first network function and store the other containers until the first apparatus receives further routing information for routing other containers.

Example 1.5

The UE of example 1.4, wherein the UE is not in a radio resource control (RRC) connected mode.

Example 1.6

The UE of example 1.1, wherein the first routing information is included in a first temporary identifier and subsequent routing information is included in a subsequent temporary identifier.

Example 1.7

The UE of example 1.6, wherein the first temporary identifier is a serving temporary mobile subscriber identifier (S-TMSI) for the first NAS container targeted for the network function and the subsequent temporary identifier is an S-TMSI for the subsequent NAS container targeted for the network function.

Example 1.8

The UE of example 1.1, wherein the first apparatus is a radio access network (RAN).

Example 1.9

The UE of example 1.1, wherein the subsequent container includes the encrypted subsequent payload.

Example 2.1

An apparatus, comprising:

means for receiving, by a first apparatus, a first message from a user equipment (UE), the first message including a first temporary identifier comprising routing information for forwarding a first non access stratum (NAS) container, a first container and a subsequent container, wherein the first container includes a first encrypted payload, and the subsequent container includes a subsequent encrypted payload and subsequent temporary identifier comprising routing information for forwarding the subsequent network function;

means for reading, by the first apparatus, at least the first routing information; and means for transmitting, by the first apparatus, the first container to the first network function based on the first temporary identifier.

Example 2.2

The apparatus of example 2.1, wherein the first message includes a flag identifier or a number identifier.

Example 2.3

The apparatus of example 2.2, wherein upon the flag identifier being set to a first value, further comprising reading, by the first apparatus, the subsequent temporary identifier and transmitting, by the first apparatus, the subsequent container to the subsequent network function based on the subsequent temporary identifier.

Example 2.4

The apparatus of example 2.2, wherein upon the flag identifier being set to a second value, further comprising storing the subsequent container.

Example 2.5

The apparatus of example 2.4, further comprising receiving, by the first apparatus, a second message from the first network function, the second message including the subsequent temporary identifier for the second network function, and transmitting the subsequent container to the subsequent network function based on the subsequent temporary identifier.

Example 2.6

The apparatus of example 2.2, wherein the number identifier indicates the first apparatus is to forward the number of containers identified in the number identifier to the first network function and store the other containers until it receives further routing information for routing other containers.

Example 2.7

The apparatus of example 2.1, wherein the first apparatus is a radio access network (RAN).

Example 2.8

The apparatus of example 2.1, wherein the first routing information is within a serving temporary mobile subscriber identifier for an NAS payload type (S-TMSI) for the first container targeted for the first network function and the subsequent routing information is within an S-TMSI for the subsequent container targeted for the subsequent network function.

Example 3.1

A UE, comprising:

means receiving, by the UE, a first message from a first apparatus, the first message including a first temporary identifier including routing information for a first non-access stratum (NAS) sublayer, a first container, and a subsequent temporary identifier including routing information for a subsequent NAS layer and a subsequent container, wherein the first container includes a first encrypted payload, and the subsequent container includes a subsequent encrypted payload;

means for reading, by the UE, the first temporary identifier and the second temporary identifier;

means for transmitting, by an access stratum (AS) layer of the UE, the first container to the first NAS sublayer based on the first temporary identifier; and means for transmitting, by the AS layer of the UE, the second container to the second NAS sublayer based on the second temporary identifier.

Example 4.1

An apparatus, comprising:

means for receiving, by a first apparatus, a plurality of non access stratum (NAS) payloads, wherein a first NAS payload is received from a first network function and a second payload is received from a second network function;

means for encrypting, by the first apparatus, the first payload with a first encryption generating a first encrypted payload and the second payload with a second encryption generating a second encrypted payload, wherein the first encryption is associated with a first NAS container that is associated with first network function and the second encryption is associated with a second NAS container that is associated with second network function;

means for generating, by the first apparatus, a first message that includes a first temporary identifier associated with the first network function and a first container, and a second temporary identifier associated with the second network function and a second container, wherein the first container includes the first encrypted payload, and the second container includes the second encrypted payload; and means for transmitting, by the first apparatus, the first message to a user equipment (UE).

Example 4.2

The apparatus of example 4.1, wherein the second network function is the same as the first network function.

Example 4.3

The apparatus of example 4.2, wherein the second network function is a different network function than the first network function.

In various embodiments, independent NAS sublayers (e.g. MM, SM, Security, etc.) may be supported by a UE with independent encoding/decoding & security keys. Accordingly, orthogonality between NAS containers in the UE may be enabled and also between different functions in the network. Accordingly, independent security terminations for each NAS container and a single parent key may be determined, as well as one authentication per UE, and independent security associations may be enabled by independent key set IDs.

The embodiments and aspects disclosed herein are examples of the present disclosure and may be embodied in various forms. For instance, although certain embodiments herein are described as separate embodiments, each of the embodiments herein may be combined with one or more of the other embodiments herein. Specific structural and functional details disclosed herein are not to be interpreted as limiting, but as a basis for the claims and as a representative basis for teaching one skilled in the art to variously employ the present disclosure in virtually any appropriately detailed structure. Like reference numerals may refer to similar or identical elements throughout the description of the figures.

The phrases "in an aspect," "in aspects," "in various aspects," "in some aspects," or "in other aspects" may each refer to one or more of the same or different aspects in accordance with this present disclosure. The phrase "a plurality of" may refer to two or more.

In various embodiments, the terms "first message" and "second message", as well as any subsequent messages may refer to any messages that are transmitted or received in an order and are not necessarily limited to any particular message. In various embodiments, the term "subsequent" does not necessarily imply any order in sequence or in time.

The phrases "in an embodiment," "in embodiments," "in various embodiments," "in some embodiments," or "in other embodiments" may each refer to one or more of the same or different embodiments in accordance with the present disclosure. A phrase in the form "A or B" means "(A), (B), or (A and B)." A phrase in the form "at least one of A, B, or C" means "(A); (B); (C); (A and B); (A and C); (B and C); or (A, B, and C)."

Any of the herein described methods, programs, algorithms or codes may be converted to, or expressed in, a programming language or computer program. The terms "programming language" and "computer program," as used herein, each include any language used to specify instructions to a computer, and include (but is not limited to) the following languages and their derivatives: Assembler, Basic, Batch files, BCPL, C, C+, C++, Delphi, Fortran, Java, JavaScript, machine code, operating system command languages, Pascal, Perl, PL1, Python, scripting languages, Visual Basic, metalanguages which themselves specify programs, and all first, second, third, fourth, fifth, or further generation computer languages. Also included are database and other data schemas, and any other meta-languages. No distinction is made between languages which are interpreted, compiled, or use both compiled and interpreted approaches. No distinction is made between compiled and source versions of a program. Thus, reference to a program, where the programming language could exist in more than one state (such as source, compiled, object, or linked) is a reference to any and all such states. Reference to a program may encompass the actual instructions and/or the intent of those instructions.

While aspects of the present disclosure have been shown in the drawings, it is not intended that the present disclosure be limited thereto, as it is intended that the present disclosure be as broad in scope as the art will allow and that the specification be read likewise. Therefore, the above description should not be construed as limiting, but merely as exemplifications of particular aspects. Those skilled in the art will envision other modifications within the scope and spirit of the claims appended hereto.

What is claimed is:

1. A method, comprising:

receiving, at an access stratum (AS) layer of a user equipment (UE), a plurality of non access stratum (NAS) payloads, wherein a first NAS payload of the plurality of NAS payloads is received from a first NAS sublayer and a subsequent payload of the plurality of NAS payloads is received from a subsequent NAS sublayer;

encrypting, by the UE, the first payload with a first encryption generating a first encrypted payload and the subsequent payload with a subsequent encryption generating a subsequent encrypted payload, wherein the first encryption is associated with a first network function and the subsequent encryption is associated with a subsequent network function;

generating, by the UE, a first message that includes a first temporary identifier comprising of routing information for the first network function and a first container, and a subsequent container, wherein the first container includes the first encrypted payload and the subsequent container includes the subsequent encrypted payload; and transmitting, by the UE, the first message to a first apparatus.

2. The method of claim 1, wherein the first message includes a flag identifier that identifies that the first apparatus is to forward the first container to the first network function based on the first temporary identifier comprising of the routing information and the subsequent containers to the subsequent network functions based on the subsequent temporary identifiers comprising of routing information for those network functions.

3. The method of claim 1, wherein the first message includes a flag identifier that identifies that the first apparatus is to forward the first container to the first network function based on the first routing information and store the subsequent containers.

4. The method of claim 1, wherein the first message includes an indicator number that indicates the first apparatus is to forward the indicated number of containers to the first network function and store the other containers until the first apparatus receives further routing information for routing other containers.

5. The method of claim 4, wherein the receiving, the encrypting, the generating, and the transmitting are performed while the UE is not in a radio resource control (RRC) connected mode.

6. The method of claim 1, wherein the first routing information is included in a first temporary identifier and subsequent routing information is included in a subsequent temporary identifier.

7. The method of claim 6, wherein the first temporary identifier is a serving temporary mobile subscriber identifier (S-TMSI) for the first container targeted for the network function and the subsequent temporary identifier is an S-TMSI for the subsequent container targeted for the network function.

8. The method of claim 1, wherein the first apparatus is a radio access network (RAN) entity.

9. The method of claim 1, wherein the subsequent container includes the encrypted subsequent payload.

10. A non-transitory processor-readable medium storing instructions which, when executed by at least one processor of a IE, cause the IE at least to perform: receiving, at an access stratum (AS) layer of the IE, a plurality of non access stratum (NAS) payloads, wherein a first NAS payload of the plurality of NAS payloads is received from a first NAS sublayer and a subsequent payload of the plurality of NAS payloads is received from a subsequent NAS sublayer; encrypting, by the IE, the first payload with a first encryption generating a first encrypted payload and the subsequent payload with a subsequent encryption generating a subsequent encrypted payload, wherein the first encryption is associated with a first network function and the subsequent encryption is associated with a subsequent network function; generating, by the IE, a first message that includes a first temporary identifier comprising of routing information for the first network function and a first container, and a subsequent container, wherein the first container includes the first encrypted payload and the subsequent container includes the subsequent encrypted payload; and transmitting, by the UE, the first message to a first apparatus.

11. The non-transitory processor-readable medium of claim 10, wherein the first message includes a flag identifier that identifies that the first apparatus is to forward the first container to the first network function based on the first temporary identifier comprising of the routing information and the subsequent containers to the subsequent network functions based on the subsequent temporary identifiers comprising of routing information for those network functions.

12. A user equipment (UE), comprising:

at least one processor; and at least one memory storing instructions which, when executed by the at least one processor, cause the UE at least to perform:

receiving, at an access stratum (AS) layer of the UE, a plurality of non access stratum (NAS) payloads, wherein a first NAS payload of the plurality of NAS payloads is received from a first NAS sublayer and a subsequent payload of the plurality of NAS payloads is received from a subsequent NAS sublayer;

encrypting, by the UE, the first payload with a first encryption generating a first encrypted payload and the subsequent payload with a subsequent encryption generating a subsequent encrypted payload, wherein the first encryption is associated with a first network function and the subsequent encryption is associated with a subsequent network function;

generating, by the UE, a first message that includes a first temporary identifier comprising of routing information for the first network function and a first container, and a subsequent container, wherein the first container includes the first encrypted payload and the subsequent container includes the subsequent encrypted payload; and transmitting, by the UE, the first message to a first apparatus.

13. The user equipment of claim 12, wherein the first message includes a flag identifier that identifies that the first apparatus is to forward the first container to the first network function based on the first temporary identifier comprising of the routing information and the subsequent containers to the subsequent network functions based on the subsequent temporary identifiers comprising of routing information for those network functions.

14. The user equipment of claim 12, wherein the first message includes a flag identifier that identifies that the first apparatus is to forward the first container to the first network function based on the first routing information and store the subsequent containers.

15. The user equipment of claim 12, wherein the first message includes an indicator number that indicates the first apparatus is to forward the indicated number of containers to the first network function and store the other containers until the first apparatus receives further routing information for routing other containers.

16. The user equipment of claim 15, wherein the instructions, when executed by the at least one processor, cause the UE to perform the receiving, the encrypting, the generating and the transmitting while the UE is not in a radio resource control (RRC) connected mode.

17. The user equipment of claim 12, wherein the first routing information is included in a first temporary identifier and subsequent routing information is included in a subsequent temporary identifier.

18. The user equipment of claim 17, wherein the first temporary identifier is a serving temporary mobile subscriber identifier (S-TMSI) for the first container targeted for the network function and the subsequent temporary identifier is an S-TMSI for the subsequent container targeted for the network function.

19. The user equipment of claim 12, wherein the first apparatus is a radio access network (RAN) entity.

20. The user equipment of claim 12, wherein the subsequent container includes the encrypted subsequent payload.

* * * * *